United States Patent
Warren

(10) Patent No.: US 10,026,245 B2
(45) Date of Patent: Jul. 17, 2018

(54) MOBILE DEVICE BASED AUTHENTICATION

(71) Applicant: Vivint, Inc., Provo, UT (US)

(72) Inventor: Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 412 days.

(21) Appl. No.: 14/231,458

(22) Filed: Mar. 31, 2014

(65) Prior Publication Data

US 2015/0279134 A1    Oct. 1, 2015

(51) Int. Cl.
| | | |
|---|---|---|
| *H04W 12/06* | (2009.01) | |
| *G07C 9/00* | (2006.01) | |
| *G08C 17/02* | (2006.01) | |
| *H04L 29/06* | (2006.01) | |
| *H04W 4/14* | (2009.01) | |

(52) U.S. Cl.
CPC ......... *G07C 9/00039* (2013.01); *G08C 17/02* (2013.01); *H04L 63/0853* (2013.01); *H04L 63/18* (2013.01); *H04W 12/06* (2013.01); *G07C 9/00103* (2013.01); *G08C 2201/31* (2013.01); *G08C 2201/60* (2013.01); *G08C 2201/93* (2013.01); *H04L 2463/082* (2013.01); *H04W 4/14* (2013.01)

(58) Field of Classification Search
CPC ........ H04W 12/06; H04W 12/08; H04W 4/12
USPC .................................. 340/5.85, 5.1, 5.8, 5.81
See application file for complete search history.

(56) References Cited

U.S. PATENT DOCUMENTS

| | | | |
|---|---|---|---|
| 8,011,597 B2* | 9/2011 | Phillippo | B60H 1/0075 236/91 C |
| 2006/0137005 A1 | 6/2006 | Park | |
| 2008/0181374 A1* | 7/2008 | Script | H04M 3/4872 379/88.23 |
| 2009/0273438 A1* | 11/2009 | Sultan | G07C 9/00103 340/5.7 |
| 2010/0037301 A1 | 2/2010 | Jones | |
| 2010/0103106 A1* | 4/2010 | Chui | G06F 3/017 345/166 |

(Continued)

FOREIGN PATENT DOCUMENTS

KR        10-1123045        3/2012

OTHER PUBLICATIONS

International Search Report and Written Opinion of the International Searching Authority for PCT/US2015/022560, dated Jul. 7, 2015.

(Continued)

*Primary Examiner* — Steven Lim
*Assistant Examiner* — Kam Ma
(74) *Attorney, Agent, or Firm* — Holland & Hart LLP

(57) ABSTRACT

Methods and systems are described for controlling an automation and security system. According to at least one embodiment, an apparatus for voice control of an automation and security system includes a processor, a memory in electronic communication with the processor, and instructions stored in the memory. The instructions are executable by the processor to receive input from the user to perform at least one function of the automation and security system, receive confirmation that the user has received an authentication message at an electronic device carried by the user, and initiate the at least one function.

21 Claims, 10 Drawing Sheets

(56) References Cited

U.S. PATENT DOCUMENTS

2012/0276868 A1* 11/2012 Martell ............... H04L 12/1453
                                                       455/406
2012/0280783 A1* 11/2012 Gerhardt ............ G07C 9/00309
                                                       340/5.6
2013/0160080 A1    6/2013 Shin et al.
2013/0200991 A1*  8/2013 Ricci ...................... B60K 37/06
                                                       340/4.3

OTHER PUBLICATIONS

Machine translation of the specification, claims and abstract of KR10-1123045. Mar. 16, 2012.

* cited by examiner

MOBILE DEVICE BASED AUTHENTICATION

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home/business automation and security products. Advancements in mobile devices allow users to monitor and/or control an aspect of a home or business. As automation and security products expand to encompass other systems and functionality in the home or business, opportunities exist for improved authentication of users of the automation and security products and greater ease of operating the automation and security products.

SUMMARY

Methods and systems are described for voice control of an automation and/or security system. According to at least one embodiment, an apparatus for voice control of an automation and security system includes a processor, a memory in electronic communication with the processor, and instructions stored in the memory which are executable by the processor to receive input from the user to perform at least one function of the automation and security system, receive confirmation that the user has received an authentication message at an electronic device carried by the user, and initiate the at least one function.

In another example, the electronic device may be a cell phone and the authentication message is a text message. The authentication message may include information about the at least one function. The electronic device may include an application that displays the authentication message to the user. The instructions may be executable by the processor to receive a registration of the electronic device as being associated with the user. The instructions may be executable by the processor to receive a user authentication input from the user. The user authentication input may be a password or PIN code of the user. The input from the user may be received at a control panel of the automation and security system. The input from the user may be received as a voice command. The at least one function may be one of arming or disarming the automation and security system. The instructions may be executable by the processor to receive confirmation that the user has authorized the at least one function using the electronic device.

Another embodiment relates to a computer-program product for authenticating a user of an automation and security system. The computer-program product includes a non-transitory computer-readable medium storing instructions executable by a processor to receive a first user authentication input from the user, receive confirmation that the user received an authentication message on an electronic device in the user's possession as a second user authentication input, receive input from the user to initiate at least one function of the automation and security system, and initiate the at least one function.

In one example, the first user authentication input is one of a password and a PIN code. The instructions may be executable by the processor to receive confirmation that the user has authorized the at least one function using the electronic device. The first user authentication input may include confirmation of the user's presence at a property monitored by the automation and security system. The instructions may be executable by the processor to send the authentication message to the electronic device.

A further embodiment relates to a computer-implemented method for authenticating a user of an automation and security system. The method includes determining a location of the user based on use of the automation and security system, authenticating the user by receiving confirmation that the user possesses a handheld electronic device, and initiating at least one function of the automation and security system after authenticating the user.

In one example, the method may further include sending a message to the handheld electronic device, and authenticating the user may include receiving an input entered on the handheld electronic device by the user in response to the message. Authenticating the user may include receiving an input entered on the handheld electronic device by the user authorizing the at least one function. Determining a location of the user may include receiving at least one of a user command and a user authentication input.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
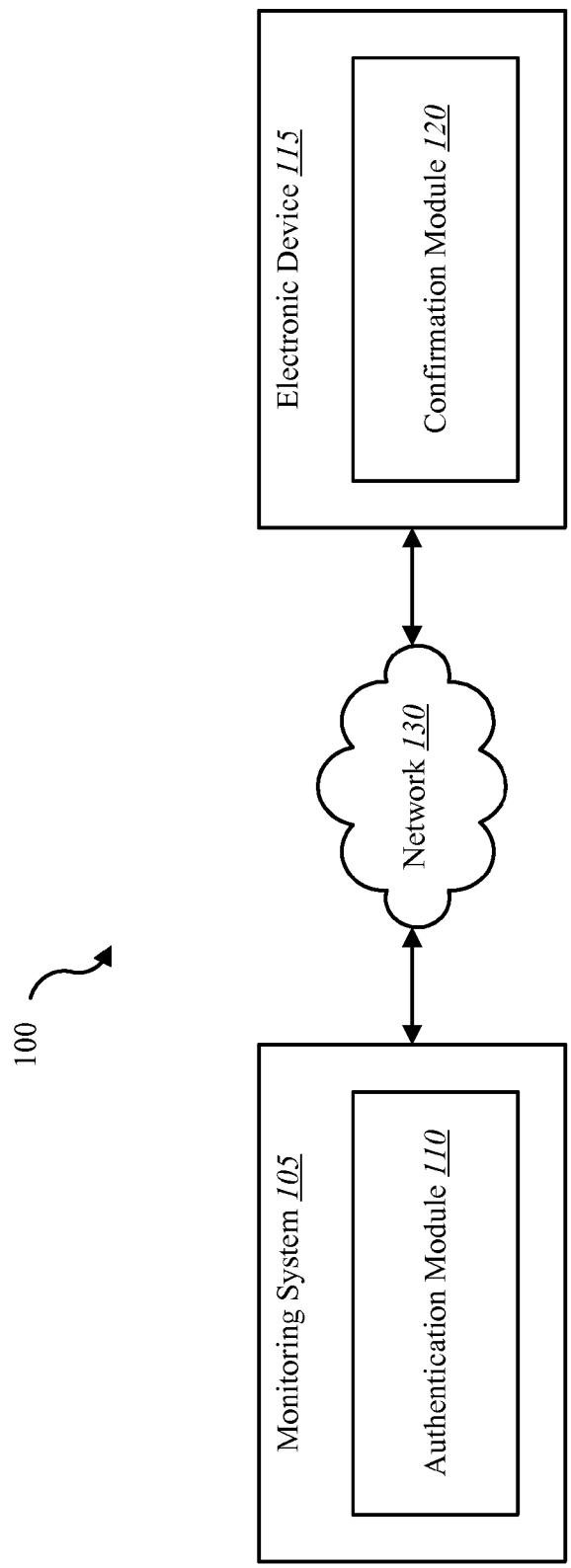
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. The automation and security systems and methods disclosed herein may generally be referred to as monitoring systems, may include automation and/or security functionality, and may include systems and methods for use in home and business and/or commercial settings. The systems and methods described herein relate generally to controlling operation, set up, and/or modification of a monitoring system. Some aspects of the present disclosure relate to improving processes for authenticating users of the monitoring system to provide enhanced certainty that only authorized users are permitted to perform certain functions related to the monitoring system. Other aspects relate to simplification of the authenticating process to provide improved ease of operating and/or interfacing with the automation and security system.

The systems and methods disclosed herein may have particular relevance in at least two scenarios. In a first scenario, there is an objective to provide improved security to perform certain functionality related to the monitoring system. For example, the monitoring system may require input of a password or PIN code as an initial authentication step for accessing and/or controlling certain aspects of the monitoring system. The present systems and methods may provide for an additional step of authentication, and may be referred to as a multi-factor authentication system or protocol. In addition to entering the password or PIN code, the user must confirm receipt of an authentication message via an electronic device in the possession of the user (e.g., a cell phone, tablet, computer, or the like). In another example, the user's presence or interaction with the monitoring system in any way may be used as the initial authentication factor, and confirming receipt of an authentication message via the electronic device may be used as a second authentication factor. The user's presence or interaction with the monitoring system may include, for example, interacting with a control panel, providing a voice command, being detected with a motion sensor or video camera, or actuating a lock mechanism or door opener associated with the property being monitored by the monitoring system.

In another scenario, the systems and methods disclosed herein may provide improved ease of operating the monitoring system by eliminating, for example, the need to navigate a user interface at a control panel or in an app on an electronic device, operate keys to unlock a door, enter a password or pin code, or take other information specific steps. For example, a user may state a voice command that is received by the monitoring system. The monitoring system then authenticates the command and user by requesting feedback from the user via the electronic device in the possession of the user. According to this scenario, the user may be able to initiate some functionality related to the monitoring system by simply stating a command and then performing a simple interaction with the electronic device held in his possession (e.g., touching the screen, opening a text message, selecting a response display by an app on the electronic device, etc.).

Generally, the systems and methods disclosed herein may apply to situations in which someone tries to initiate an action via the monitoring system. Some level of authentication occurs in association with this attempted initiated action, but the assurance level of the authentication is insufficient for the requested action. The monitoring system may be programmed to require a higher level of assurance for authentication before initiating the action. Before initiating the action, the monitoring system reaches out to an electronic device in the possession of the user via, for example, a mobile app, text message, or the like. Because the electronic device has been pre-registered and known to be associated with the user or an authorized set of users, receiving a confirmation from the user that he has received an authentication message from the electronic device (or answers a question via the electronic device) will provide the required authentication.

In the example of a mobile app that has been pre-downloaded onto the electric device, the mobile app is activated to notify the user of the attempted initiated action, and the user is required to take an action on the electronic device to prove that they are in possession of the electronic device. In one example, the mobile app may interrupt the user (e.g., provide an audible sound or vibration) and/or display a message or request confirmation in some way so that the user may respond with authorization of the attempted initiated action, or at least confirmation that he possesses the electronic device. Once the monitoring system receives the authentication response via the electronic device, the monitoring system may carry out the requested action. In essence, the systems and methods disclosed herein relate to circumstances in which an action is initiated independently of an electronic device in the possession of the user associated with a monitoring system (e.g., a cell phone) and the electronic device. The electronic device is typically remote and separate from the user interface with the monitoring system and is used to confirm authentication of the user.

Using an electronic device in the possession of a user as one factor in authenticating the user typically requires a preliminary step of registering the electronic device. The electronic device may be registered in a number of ways using, for example, an identifier associated with the electronic device. Cell phones typically include a phone number identifier. Other devices may include an address or other identifier (e.g., a Mac address associated with an Apple® brand device) that may be used to confirm that the electronic device is owned and/or controlled by a particular user. Since a user may own multiple electronic devices that may be in their possession at any given time, the monitoring system may provide the option of confirming receipt of an authentication message at any one of the plurality of electronic devices, or any single electronic device preselected by the user.

FIG. 1 is a block diagram illustrating one embodiment of an environment 100 in which the present systems and methods may be implemented. In some embodiments, the systems and methods described herein may be performed on a monitoring system 105 (e.g., an automation system or security system for use with a home or business). The environment 100 may include the monitoring system 105 and an electronic device 115 which communicate over at least one network 130. Monitoring system 105 may include an authentication module 110. Electronic device 115 may include a confirmation module 120. The network 130 provides communication via, for example, wired or wireless connections. Further, network 130 may include a plurality of communication mediums.

In some embodiments, monitoring system 105 may be in communication with one or more sensors associated with, for example, an automation system and/or a security system. A sensor may include, for example, a camera sensor, an audio sensor, a forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heart beat sensor, breathing sensor, oxygen sensor, carbon dioxide sensor, brain wave sensor, movement sensor, voice sensor, and the like.

In some configurations, monitoring system 105 may include additional components such as, for example, those components described below with reference to FIG. 3. Authentication module 110, which is described in further detail below related to FIG. 4, is operable to provide functionality related to authenticating users of monitoring system 105. Authentication module 110 may provide multiple levels of authentication. One level of authentication may be receiving a password, PIN code, voice command, face recognition information, or other sensor signal that confirms and/or authenticates a particular user or one of a plurality of authorized users for monitoring system 105. Authentication module 110 may be operable to provide another authentication factor in response to interactions with electronic device 115. Electronic device 115 may be a preregistered device associated with a user of monitoring system 105. Electronic device 115 may include, for example, a mobile computing device (e.g., a tablet computing device, a smart phone, etc.) or a mobile personal computing device (e.g., a laptop), or a fab or similar electronic device having limited and/or specific functionality. Electronic device 115 is typically remote and separately operable from the monitoring system 105. The user may interact with electronic device 115 in response to communications with authentication module 110 to confirm that the user possesses electronic device 115 and/or provide authorization for the requested actions initiated at the monitoring system 105.

Authentication module 110 may, for example, detect activity associated with monitoring system 105 that would require authentication via electronic device 115, initiate functionality at electronic device 115 that would require user confirmation at electronic device 115, receive an authentication confirmation from electronic device 115, and provide execution of activities at monitoring system 105 that required authentication via electronic device 115.

Confirmation module 120 of electronic device 115 may be operable to, for example, receive prompts from authentication module 110 via network 130, generate signals or messages to which the user possessing electronic device 115 may respond to, and generate confirmation signals to be sent back to authentication module 110 reflecting the user's response to authentication messages generated by a confirmation module 120.

In one scenario, monitoring system 105 operates in a home as at least one of an automation system and a security system. A user who is interacting with monitoring system 105 may wish to disarm a security feature of monitoring system 105 prior to entering the home. The user may speak a command such as "disarm system" prior to attempting to unlock a front door of the home. Authentication module 110 may recognize the voice command and activate the confirmation module 120 to provide a message to the user on electronic device 115. The message may simply state "do you want to disarm the security system at home?" with reply buttons on a display screen of electronic device 115 marked as "yes" and "no". The user may then press the "yes" button, and confirmation module 120 prepares a response message that confirms the user's intent to disarm the system. Authentication module 110 then permits and/or carries out disarming of the security feature of monitoring system 105. In this scenario, the user was able to avoid having to interact with the control panel on the inside of the home to disarm the system (e.g., entering a PIN code and pressing buttons to disarm the system).

In another scenario, the user attempts to modify a rule of operation monitoring system 105 (e.g., change thermostat from 60 degrees to 70 degrees each morning at 6:00 to each morning at 10:00). Monitoring system 105 may require input of a PIN code or password as a first level of authentication to change the rule. Authentication module 110 may require additional authentication to change this particular rule. Authentication module 110 may require authentication at electronic device 115 to confirm that the user requesting the rule change is in possession of the electronic device 115. Confirmation module 120 may operate an app loaded onto electronic device 115 to display a prompt (e.g., red button) which the user presses to confirm that he possesses the electronic device 115. Confirmation module 120 may provide an authentication message to authentication module 110, which is used by authentication module 110 as a second level of authentication to then permit the requested rule change.

Confirmation module 120 may operate in a variety of ways to obtain different types of information from the user. The two scenarios described above explain two types of information, wherein one type is confirmation of a specific action requested at monitoring system 105, and the second type is simply confirmation that the electronic device is in the possession of the user. Other examples include sending a text message to the user on the electronic device 115 that the user must either open or respond to with a return text comprising certain information (e.g., a code, password, yes/no terms, or the like). In another example, a plurality of options are presented to the user, any or all of which the user may select or respond to with a yes/no answer (e.g., Disarm system? Unlock door? Turn on lights? Turn on HVAC? Permit Joey to enter house?).

One potential advantage related to the environment 100 is that an authorized user of monitoring system 105 may more easily make it possible for other people to receive authorization to perform actions associated with monitoring system 105. Typically, users of a particular monitoring system 105 may be required to become familiar with how to interface with the monitoring system 105 (e.g., via a control panel, certain voice command, terminology, etc.). Since various monitoring systems have different user interfaces and functionality, a significant amount of time may be required to learn how to properly navigate the monitoring system. Additionally, an authorized user is typically required to give out a secret password or PIN code in order to have a friend, neighbor, cleaning person, maintenance person, etc., to operate the monitoring system 105. The systems and methods disclosed herein may avoid some of those potentially complicating factors by simply registering an electronic device in possession of the temporary user that the authentication module 110 can communicate with to provide the desired authentication for that temporary user and the actions that he requests of monitoring system 105. In another example, the authorized user may loan his own pre-registered electronic device to the temporary user.

The registration of an electronic device carried by a temporary user may be performed by the temporary user downloading an app that operates on the electronic device, wherein the app is registered using authorization codes, identifiers, or other information provided by the authorized user. Once the temporary user possesses a registered electronic device 115, the temporary user may be able to avoid some of the difficulties otherwise associated with operating monitoring system 105 (e.g., interfacing with the control panel, entering a secret PIN code, etc.).

Figure 2:
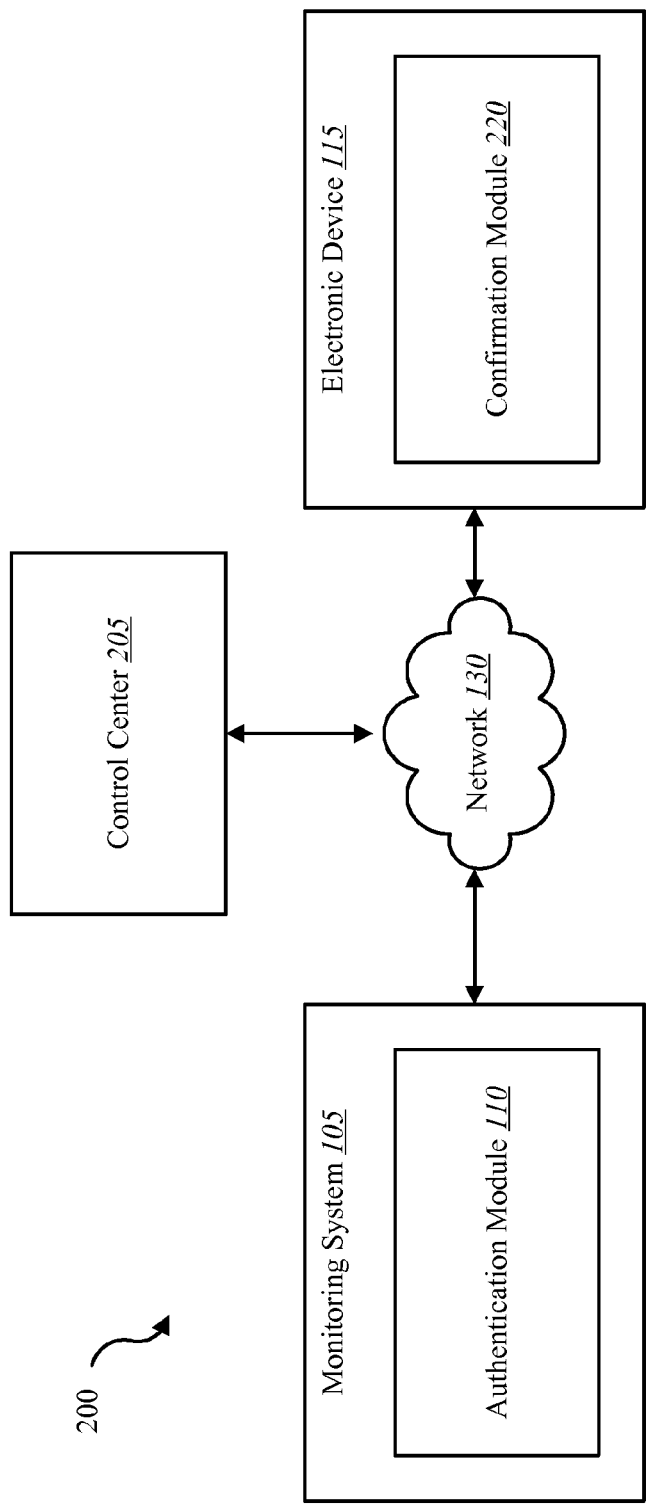
FIG. 2 is a block diagram of another environment in which the present systems and methods may be implemented.

Referring now to FIG. 2, in some embodiments, environment 200 may include the components of environment 100 described above, and may further include a control center 205. Control center 205 may provide at least some back-end support for monitoring system 105. For example, control center 205 may include memory and capability to communicate with third parties (e.g., fire, police, etc.). Messages to and from authentication module 110 and confirmation module 220 may be routed at least in part through control center 205. At least some of the communications and activities performed by authentication module 110 and/or confirmation module 220 may be stored in control center 205 and be made available to a user. In at least some examples, some features or functionality of authentication module 110 and/or confirmation module 220 may occur at control center 205 rather than at the monitoring system 105 and electronic device 115.

Figure 3:
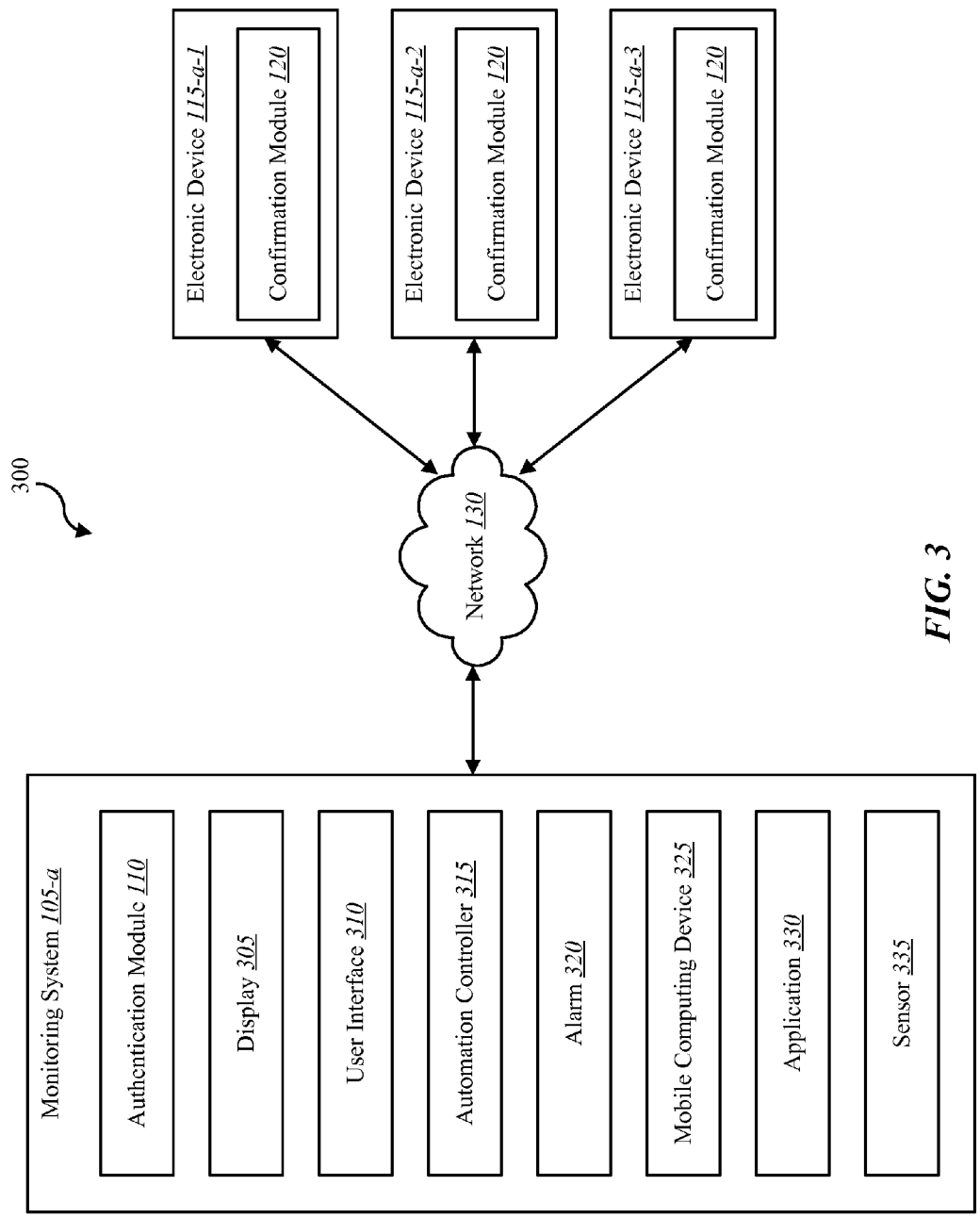
FIG. 3 is a block diagram of another environment in which the present systems and methods may be implemented.
Figure 4:
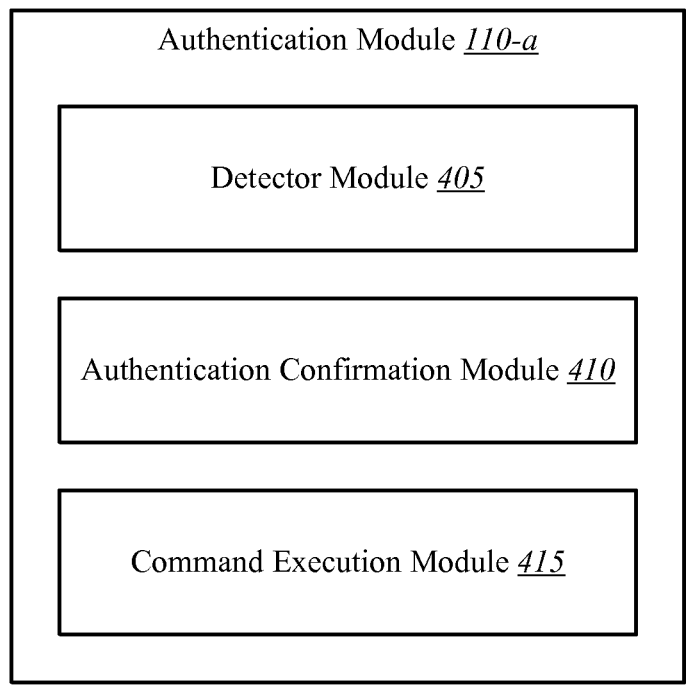
FIG. 4 is a block diagram of an example authentication module of the environments shown in FIGS. 1-3.

Referring now to FIG. 3, in some embodiments, an environment 300 may include the components of environment 100 described above, and may further include a plurality of electronic devices 115-a, and a number of additional features associated with a monitoring system 105-a. Monitoring system 105-a may be an example of monitoring system 105 illustrated in FIG. 1. Electronic devices 115-a may be examples of electronic device 115 illustrated in FIG. 1. Monitoring system 105-a may include, in addition to authentication module 110, a display 305, a user interface 310, an automation controller 315, an alarm 320, a mobile computing device 325, an application 330, and a sensor 335. Each of electronic devices 115-a-1, 115-a-2, 115-a-3 may include a confirmation module 120.

Environment 300 addresses at least two different scenarios in which a plurality of electronic devices are available for authenticating users of monitoring system 105-a. In one scenario, a single user may have a plurality of electronic devices 115-a that are registered and associated with that single user. Authentication module 110 may communicate with confirmation modules 120 of each of the electronic devices 115-a in an attempt to receive confirmation from the user that either (1) the user is in possession of one of the electronic devices 115-a-1, or (2) the user authorizes initiation of an action with monitoring system 105-a upon receiving an authentication confirmation response from any one of confirmation modules 120. Authentication module 110 may then permit carrying out of the requested initiated action.

In another scenario, the electronic devices 115-a are carried by separate authorized users of monitoring system 105-a. Upon receiving a requested initiation of an action at monitoring 105-a, authentication module 110 may communicate with each of the confirmation modules 120 of electronic devices 115-a. An authentication confirmation response from any one of the confirmation modules 120 may provide the desired level of authentication needed to proceed with the requested initiated action. In one example, an authorized user carrying one of the electronic devices 115-a may ask a neighbor to feed the user's dog at the user's house. The neighbor may enter the user's house and may be asked at a control panel of monitoring system 105-a for a PIN code to confirm authentication. Authentication module 110 may communicate with confirmation modules 120, whereupon any one of the authorized users carrying electronic devices 115-a (which may be the neighbor carrying one of the electronic devices 115-a) may provide confirmation to disarm the security system. This scenario may eliminate the requirement for the neighbor to input a password or PIN code in order to disarm the security system at the house. In this way, the authorized user(s) do not have to give out their secret password or PIN code while still permitting disarming of the security system without being in the home and/or giving one of the electronic devices 115-a to the neighbor.

Monitoring system 105-a may include any one or all of the following components: display 305, user interface 310, automation controller 315, alarm 320, mobile computing device 325, application 330, and sensor 335. Display 305 may include, for example, a digital display as part of, for example, a control panel of monitoring system 105-a. Display 305 may be provided via devices such as, for example, a desktop computer or mobile computing device 325. User interface 310 may be integrated into display 305. User interface 310 may include a plurality of menus, screens, microphones, speakers, camera, and other capabilities that permit interface with the user of monitoring system 105-a. User interface 310 may be integrated into mobile computing device 325 or other devices (e.g., one of electronic devices 115-a).

Automation controller 315 may provide features and functionality related to automation and/or security features of monitoring system 105-a. Automation controller 315 may provide at least some of the logic, processing, and/or interaction among various components of monitoring system 105-a.

Alarm 320 may provide an audible sounds, lights, or the like that provide communication with one or more users on the premises being monitored by monitoring system 105-a, or communications with a remote device or system related to a condition at a property being monitored by monitoring system 105-*a*. Alarm 320 may be integrated into display 305 in the form of, for example, text, color displays, or the like.

In some embodiments, mobile computing device 325 may include one or more processors, one or more memory devices, and/or a storage device. Examples of mobile computing device 325 may include DVRs, personal video records (PVRs), and/or mobile computing devices, smart phones, personal computing devices, computers, servers, etc.

Application 330 may allow a user to control (either directly or via automation controller 315) an aspect of the monitored property, including security, energy management, locking or unlocking a door, checking the status of a door, locating a user or item, controlling lighting, thermostats, or cameras, receiving notifications regarding a current status or anomaly associated with a home, office, place of business, and the like. In some configurations, application 330 may enable monitoring system 105-*a* to interface with automation controller 315 and utilize the user interface 310 to display automation, security, and/or energy management content on display 305, user interface 310, mobile computing device 325, or other feature of monitoring system 105-*a*. Thus, application 330, via user interface 310, may allow users to control aspects of their home, office, and/or other type of property. Further, application 330 may be installed on mobile computing device 325 in order to allow a user to interface with a function of monitoring system 105-*a* (e.g., automation controller 315).

Sensor 335 may represent one or more separate sensors or a combination of two or more sensors in a single sensor device. For example, sensor 335 may represent one or more camera sensors and one or more motion sensors connected to environment 300. Additionally, or alternatively, sensor 335 may represent a combination sensor such as both a camera sensor and the motion sensor integrated into the same sensor device. Although sensor 335 is depicted as connecting directly to monitoring system 105-*a*, in some embodiments, sensor 335 may be connected to monitoring system 105-*a* via network 130. Additionally, or alternatively, sensor 335 may be integrated into a home appliance or fixture such as a light bulb fixture. Sensor 335 may include an accelerometer to enable sensor 335 to detect a movement. Sensor 335 may include a wireless communication device, enabling sensor 335 to send and receive data and/or information to and from one or more devices in environment 300. Additionally, or alternatively, sensor 335 may include a GPS sensor to enable sensor 335 to track a location of sensor 335. Sensor 335 may include a proximity sensor to enable sensor 335 to detect proximity of a user relative to a predetermined distance from a dwelling (e.g., geo-fencing). Sensor 335 may include one or more security detection sensors such as, for example, a glass break sensor, a motion detection sensor, or both. Additionally, or alternatively, sensor 335 may include a smoke detection sensor, a carbon monoxide sensor, or both. In at least some examples, sensor 335 may detect presence of a user within a dwelling being monitored by monitoring system 105-*a*, performing certain functions (e.g., opening a door or window), or speaking a voice command. Feedback from sensor 335 may function as at least one authentication factor used by authentication module 110.

In some embodiments, a user may access the functions of monitoring system 105-*a* (e.g., automation controller 315) from mobile computing device 325. For example, in some embodiments, mobile computing device 325 includes a mobile application that interfaces with one or more functions of monitoring system 105-*a*. Electronic devices 115-*a* may be one example of mobile computing device 325. Examples of automation controller 315 may include a dedicated home automation computing device (e.g., wall-mounted controller), a personal computing device (e.g., laptop, desktop, etc.), a mobile computing device (e.g., tablet computing device, smart phone, etc.), and the like.

FIG. 4 is a block diagram 400 illustrating one example of an authentication module 110-*a*. Authentication module 110-*a* may be one example of authentication module 110 depicted in FIGS. 1, 2, and/or 3. As depicted, authentication module 110-*a* may include a detector module 405 and authentication confirmation module 410, and a command execution module 415. Authentication module 110-*a* may include more or fewer modules and capabilities in other embodiments. Similarly, authentication module 110-*a* may include additional modules and functionality than that which is described with reference to block diagram 400.

Detector module 405 may operate to detect some interaction between a user and monitoring system 105 (see FIGS. 1-3). The user interaction may include, for example, a request to initiate some function of monitoring system 105. In another example, the interaction may detect the presence of the user generally at a premises being monitored by monitoring system 105, or specific activities of the user on the premises. The detected interaction may be used to determine what level of authentication is used in order to carry out certain functions of monitoring system 105 either by the user or some other person.

Authentication confirmation module 410 may provide communication to and from confirmation module 120 of electronic device 115 (see FIGS. 1-3). Authentication confirmation module 410 may initiate a request for user confirmation at at least one electronic device 115. Authentication confirmation module 410 may send a message or provide instructions and/or input for sending or generating a message that is delivered to the user in possession of electronic device 115. Confirmation module 120 may operate to receive communications from authentication confirmation module 410 and provide the type of interface with the user in possession of electronic device 115 required in order to obtain the level of authentication needed to permit the initiated action at monitoring system 105. Authentication confirmation module 410 may receive a responsive authentication communication from confirmation module 120 required for authentication module 110-*a* to permit or not permit the proposed initiated action of monitoring system 105-*a*.

Command execution module 415 may determine whether the responsive communication from confirmation module 120 meets the requirements to authenticate users and/or actions related to the proposed initiated action of monitoring system 105-*a*. Command execution module 415 may send messages, generate signals, modify functionality of monitoring system 105, or perform other functions associated with the proposed initiated action of monitoring system 105.

Figure 5:
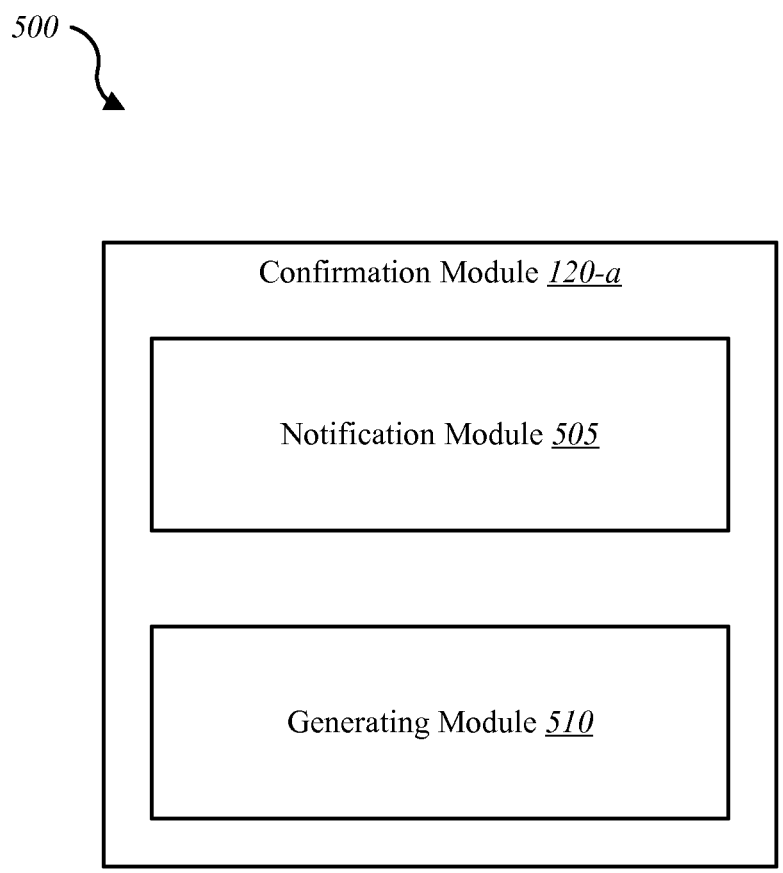
FIG. 5 is a block diagram of an example confirmation module of the environments shown in FIGS. 1-3.

FIG. 5 is a block diagram 500 illustrating an example of a confirmation module 120-*a*. Confirmation module 120-*a* may be one example of confirmation module 120 depicted in FIGS. 1, 2, and/or 3. As depicted, confirmation module 120-*a* may include a notification module 505 and a generating module 510. Confirmation module 120-*a* may include additional or fewer modules and capability in other embodiments.

Notification module 505 may receive notifications and communications from authentication module 110 and determine which type of notification or communication is needed to receive the authentication confirmation from the user in possession of the electronic device 115 upon which the confirmation module 120-*a* operates. Notification module 505 may generate a number of notifications such as, for example, a request for confirmation that the user is in possession of electronic device 115, ask a yes/no question related to a specific proposed initiated action of monitoring system 105, request a return text message, or the like.

Generating module 510 may generate a response to be delivered to authentication module 110. Generating module 510 may format the response in any desired way to provide the type of authentication message needed for authentication module 110 to determine whether to permit carrying out the proposed initiated action of monitoring system 105.

Notification module 505 and generating module 510 may be integrated into an application that is loaded onto the electronic device 115. The application (e.g., mobile app) may override other features and functionality of electronic device 115 such that the notification generated by notification module 505 is able to interrupt and/or display over other features or functionality that may be operating concurrently on electronic device 115.

Figure 6:
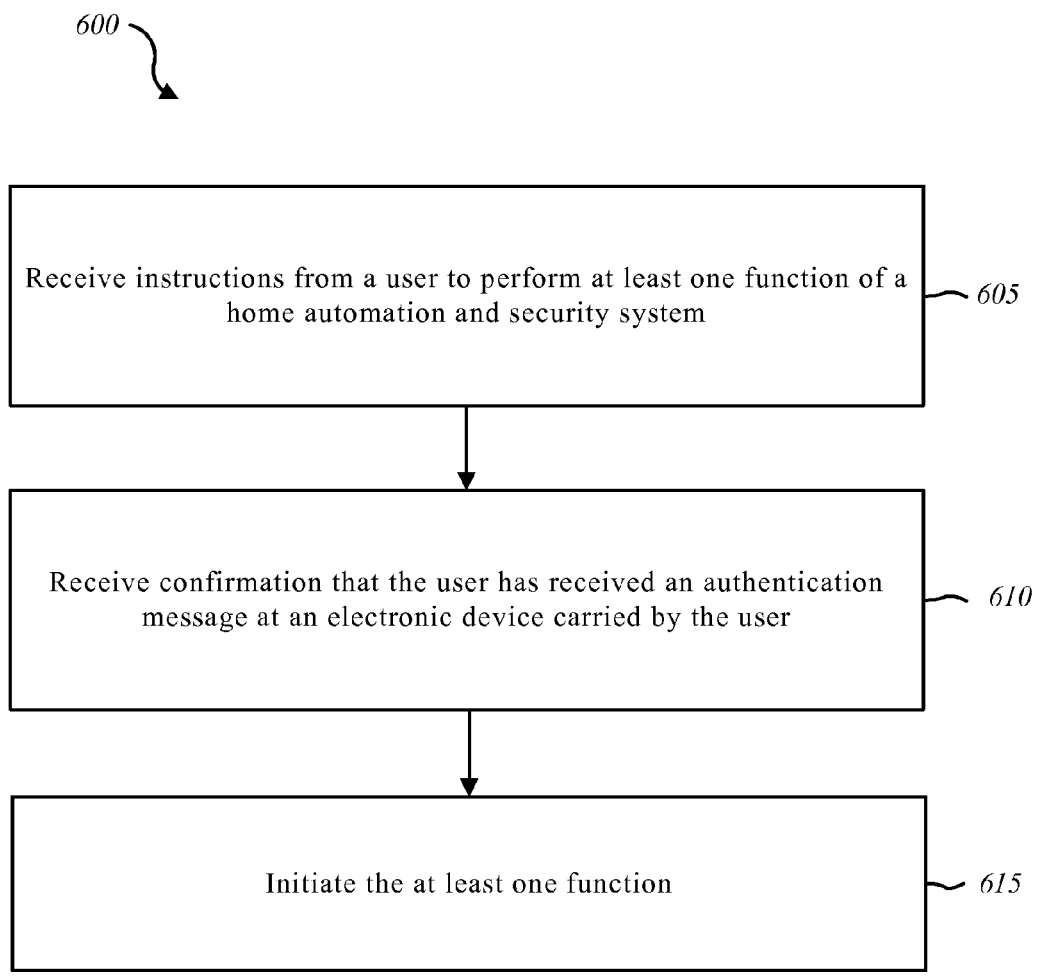
FIG. 6 is a flow diagram illustrating a method for controlling access to a home based on user occupancy.

FIG. 6 is a flow diagram illustrating one embodiment of a method 600 for authenticating a user of a monitoring system (e.g., automation system and/or security system). In some configurations, the method 600 may be implemented by the authentication module 110 of monitoring system 105 shown in FIGS. 1, 2, 3, and/or 4. In other examples, method 600 may be performed generally by monitoring system 105 shown in FIGS. 1, 2, and/or 3, or even more generally by the environments 100, 200, and/or 300 shown in FIGS. 1-3, respectively. In some configurations, method 600 may be implemented in conjunction with electronic devices 115 shown in FIGS. 1, 2, and/or 3.

At block 605, method 600 includes receiving input (e.g., instructions) from the user to perform at least one function of the home automation and security system. Block 610 includes receiving confirmation that the user has received an authentication message at an electronic device carried by the user. At block 615, the method 600 includes initiating the at least one function. Initiating the at least one function may occur after receiving confirmation that the user has received the authentication message at the electronic device carried by the user.

Other aspects of method 600 may include providing the electronic device as a cell phone and the authentication message as a text message. The authentication message may include information about the at least one function of the home automation and security system. The electronic device may include an application that displays the authentication message to the user. Method 600 may also include receiving a registration of the electronic device in association with the user. Method 600 may include receiving a user authentication input from the user. The user authentication input may include a password or PIN code of the user. The input from the user may be received at a control panel of the home automation and security system. The input from the user may be received as a voice command. The at least one function may be one of arming or disarming the home automation and security system. Method 600 may also include receiving confirmation that the user has authorized the function using the electronic device.

Figure 7:
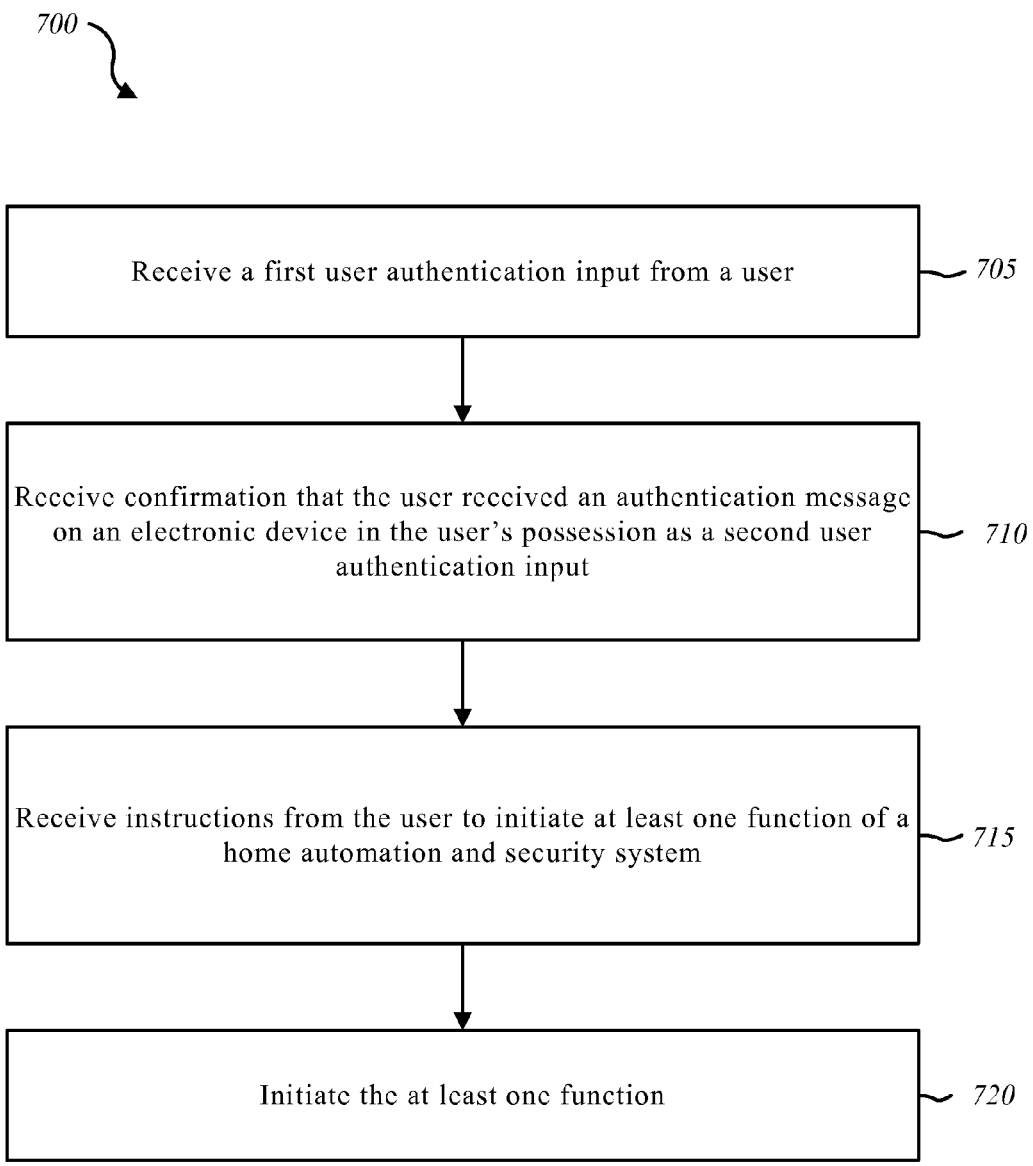
FIG. 7 is a flow diagram illustrating another method for controlling access to a home based on user occupancy.

FIG. 7 is a flow diagram illustrating one embodiment of a method 700 for authenticating a user of a monitoring system (e.g., an automation system and/or security system). In some configurations, the method 700 may be implemented by the authentication module 110 of monitoring system 105 shown in FIGS. 1, 2, 3, and/or 4. In other examples, method 700 may be performed generally by monitoring system 105 shown in FIGS. 1, 2, and/or 3, or even more generally by the environments 100, 200, 300 shown in FIGS. 1-3, respectively. In some configurations, method 700 may be implemented in conjunction with electronic devices 115 shown in FIGS. 1, 2, and/or 3.

At block 705, the method 700 includes receiving a first user authentication input from the user. Block 710 includes receiving confirmation that the user received an authentication message on an electronic device in the user's possession as a second user authentication input. At block 715, method 700 includes receiving input (e.g., instructions) from the user to initiate at least one function of the home automation and security system. Block 720 includes initiating the at least one function.

Method 700 may also include providing the first user authentication input as one of a password and a PIN code. Method 700 may include receiving confirmation that the user has authorized the function using the electronic device. The first user authentication input may include confirmation of the user's presence at a property monitored by the home automation and security system. Method 700 may include sending the authentication message to the electronic device.

Figure 8:
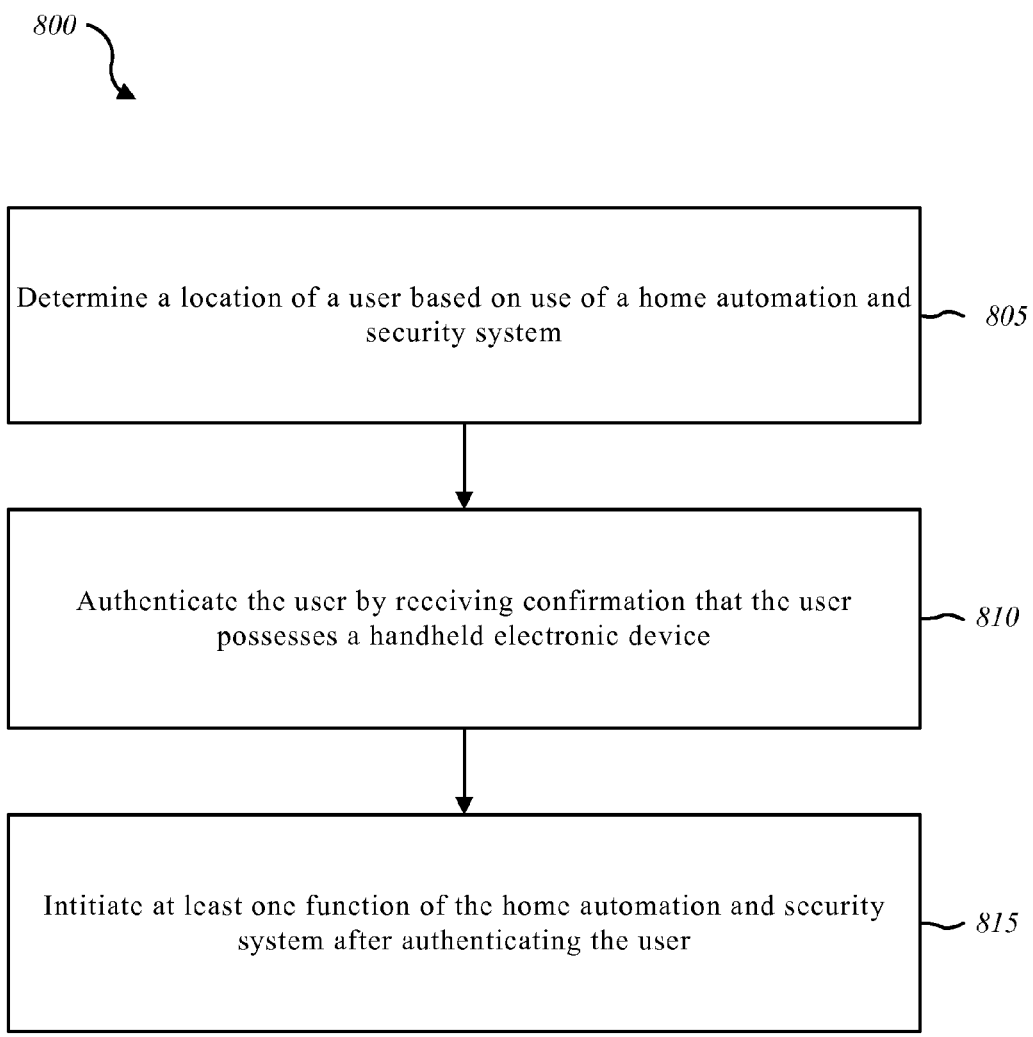
FIG. 8 is a flow diagram illustrating another method for controlling access to a home based on user occupancy.

FIG. 8 is a flow diagram illustrating one example of a method 800 for authentication of a user of a monitoring system (e.g., an automation system and/or a security system). In some configurations, the method 800 may be implemented by the authentication module 110 of monitoring system 105 shown in FIGS. 1, 2, 3, and/or 4. In other examples, method 800 may be performed generally by monitoring system 105 shown in FIGS. 1, 2, and/or 3, or even more generally by the environments 100, 200, 300 shown in FIGS. 1-3, respectively. In some configurations, method 800 may be implemented in conjunction with electronic device 115 shown in FIGS. 1, 2, and/or 3.

At block 805, the method 800 includes determining a location of a user based on use of a home automation and security system. Block 810 includes authenticating the user by receiving confirmation that the user possesses a handheld electronic device. At block 815, method 800 includes initiating at least one function of the home automation and security system after authenticating the user.

Method 800 may also include sending a message to the handheld electronic device, wherein authenticating the user includes receiving an input entered on the handheld electronic device by the user in response to the message. Authenticating the user may include receiving an input entered on the handheld electronic device by the user that authorizes the at least one function. Determining a location of a user may include receiving at least one of a user command and a user authentication input.

Figure 9:
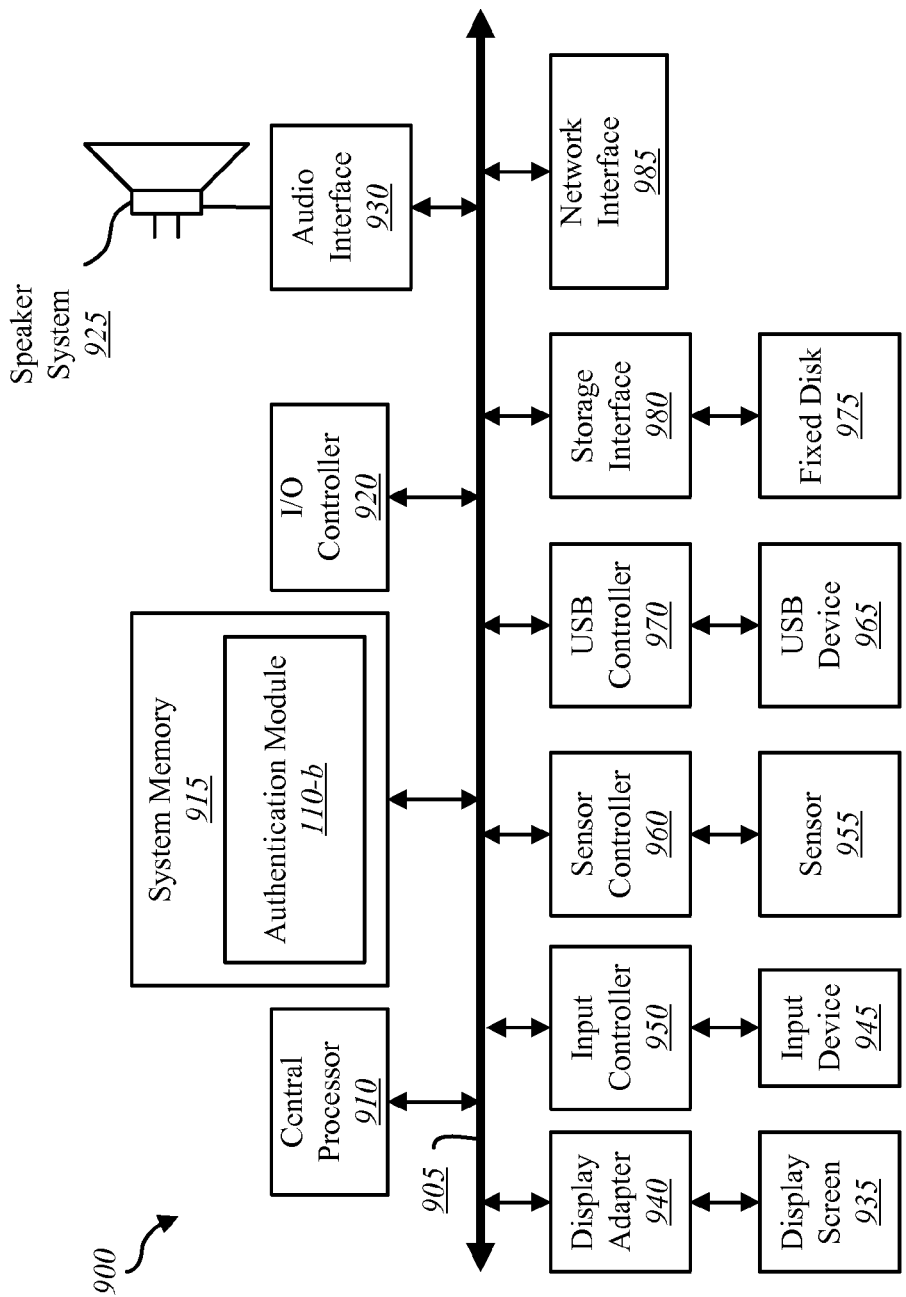
FIG. 9 is a block diagram of a computer system suitable for implementing the systems and methods of FIGS. 1-8.

FIG. 9 depicts a block diagram of a controller 900 suitable for implementing the present systems and methods. The controller 900 may be an example of the mobile computing device 325, and/or automation controller 315 illustrated in FIG. 3. In one configuration, controller 900 includes a bus 905 which interconnects major subsystems of controller 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 970), and a storage interface 980. Also included are at least one sensor 955 connected to bus 905 through a sensor controller 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, an authentication module 110-b to implement the present systems and methods may be stored within the system memory 915. The authentication module 110-b may be an example of the authentication module 110 illustrated in FIGS. 1, 2, 3, and/or 4. Applications (e.g., application 330) resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 915 or fixed disk 975. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
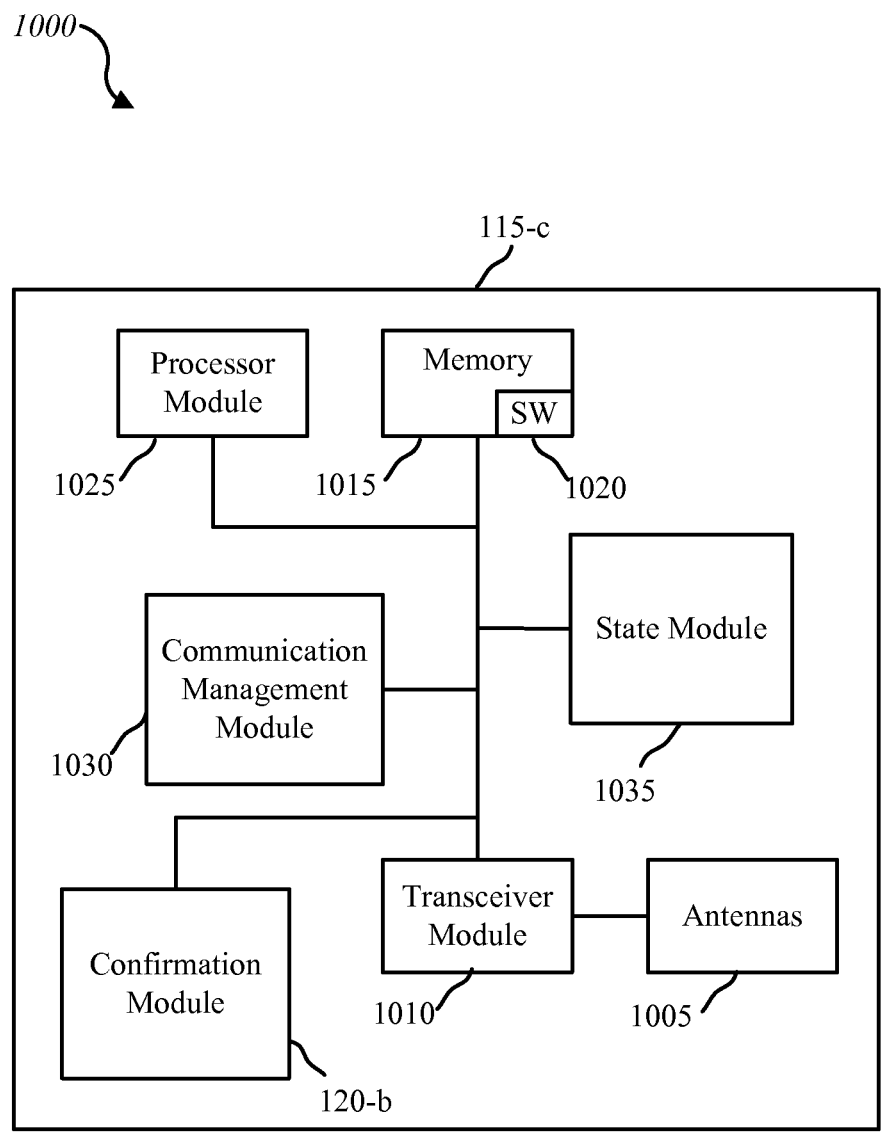
FIG. 10 is a block diagram of an example of a mobile device.

FIG. 10 is a block diagram 1000 of an electronic device 115-c. Electronic device 115-c may be one example of the electronic device 115 of FIG. 1, 2 and/or 3. The electronic device 115-c may have any of various configurations, such as personal computers (e.g., laptop computers, netbook computers, tablet computers, etc.), cellular telephones, PDAs, digital video recorders (DVRs), internet appliances, gaming consoles, e-readers, etc. The electronic device 115-c may have an internal power supply (not shown), such as a small battery, to facilitate mobile operation.

The electronic device 115-c includes antennas 1005, a transceiver module 1010, memory 1015, and a processor module 1025, which each may be in communication, directly or indirectly, with each other (e.g., via one or more buses). The transceiver module 1010 is configured to communicate bi-directionally, via the antennas 1005 and/or one or more wired or wireless links, with one or more networks, as described above. For example, the transceiver module 1010 may be configured to communicate bi-directionally with authentication module 110 of FIGS. 1, 2, and/or 3. The transceiver module 1010 may include a modem configured to modulate the packets and provide the modulated packets to the antennas 1005 for transmission, and to demodulate packets received from the antennas 1005. While the electronic device 115-c may include a single antenna, the electronic device 115-c will typically include multiple antennas 1005 for multiple links.

The memory 1015 may include random access memory (RAM) and read-only memory (ROM). The memory 1015 may store computer-readable, computer-executable software code 1020 containing instructions that are configured to, when executed, cause the processor module 1025 to perform various functions described herein (e.g., call processing, database management, message routing, etc.). Alternatively, the software code 1020 may not be directly executable by the processor module 1025 but be configured to cause the computer (e.g., when compiled and executed) to perform functions described herein.

The processor module 1025 may include an intelligent hardware device, e.g., a central processing unit (CPU), a microcontroller, an application specific integrated circuit (ASIC), etc. The processor module 1025 may include a speech encoder (not shown) configured to receive audio via a microphone, convert the audio into packets (e.g., 30 ms in length) representative of the received audio, provide the audio packets to the transceiver module 1010, and provide indications of whether a user is speaking. Alternatively, an encoder may only provide packets to the transceiver module 1010, with the provision or withholding/suppression of the packet itself providing the indication of whether a user is speaking.

According to the architecture of FIG. 10, the electronic device 115-c further includes a communications management module 1030 and a state module 1035. The communications management module 1030 may manage communications with other electronic devices 115-*c*. By way of example, the communications management module 1030 may be a component of the electronic device 115-*c* in communication with some or all of the other components of the electronic device 115-*c* via a bus. Alternatively, functionality of the communications management module 1030 may be implemented as a component of the transceiver module 1010, as a computer program product, and/or as one or more controller elements of the processor module 1025. The state module 1035 may reflect and control the current device state (e.g., context, authentication, base station association, other connectivity issues).

The components of the electronic device 115-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the electronic device 115-*c*.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for authenticating a user of a home automation and security system, comprising:
a processor;
a memory in electronic communication with the processor; and
instructions stored in the memory, the instructions being executable by the processor to:
detect a presence of the user within a predetermined distance of the home automation and security system based at least in part on sensor data;
receive, from an electronic device carried by the user, a request to perform at least one function of the home automation and security system based at least in part on the detection, the at least one function including a rule of operation for an automation and security system component associated with the home automation and security system;
determine a level of authentication associated with the request to perform the at least one function based at least in part on the detection;
receive facial recognition information from the electronic device as a first level of authentication to authorize the received request;
confirm that the user is an authorized user based at least in part on facial recognition information;
communicate, to one or more separate electronic devices associated with one or more separate authorized users of the home automation and security system, an authentication message in response to confirming the user as the authorized user;
receive confirmation that at least one of the separate authorized users has received the authentication message at the at least one separate electronic devices carried by the at least one of the separate authorized users, wherein the received confirmation comprises a second level of authentication to authorize the received request; and
modify the rule of operation of the automation and security system component based at least in part on the first level of authentication and the second level of authentication.

2. The apparatus of claim 1, wherein the electronic device is a cell phone and the authentication message is a text message.

3. The apparatus of claim 1, wherein the authentication message includes information about the at least one function.

4. The apparatus of claim 1, wherein the instructions are executable by the processor to:

receive confirmation that the user has received the authentication message at the electronic device carried by the user, wherein the electronic device includes an application that displays the authentication message to the user.

5. The apparatus of claim 1, wherein the instructions are executable by the processor to:
receive a registration of the electronic device as being associated with the user.

6. The apparatus of claim 1, wherein the instructions are executable by the processor to:
receive a user authentication input from the user.

7. The apparatus of claim 6, wherein the user authentication input is a password or PIN code of the user.

8. The apparatus of claim 1, wherein the request from the user is received at a control panel of the home automation and security system.

9. The apparatus of claim 1, wherein the request from the user is received as a voice command.

10. The apparatus of claim 1, wherein the at least one function is one of arming or disarming the home automation and security system.

11. The apparatus of claim 1, wherein the instructions are executable by the processor to:
receive confirmation that the user has authorized the at least one function using the electronic device.

12. A computer-program product for authenticating a user of an automation and security system, the computer-program product comprising a non-transitory computer-readable medium storing instructions executable by a processor to:
detect a presence of the user within a predetermined distance of the automation and security system based at least in part on sensor data;
receive input, at a control panel in a structure, from the user to initiate at least one function of the automation and security system, the at least one function including a request to change a value associated with a setting of an automation and security system component of the automation and security system;
determine a level of authentication associated with the request, to perform the at least one function, based at least in part on the detection;
receive a first user authentication input, at the control panel in the structure, from the user;
confirm that the user is an authorized user based at least in part on the first user authentication input;
communicate, to one or more electronic devices associated with one or more separate authorized users of the automation and security system, an authentication message in response to confirming the user as the authorized user;
receive confirmation that at least one of the separate authorized users received the authentication message via at least one of the electronic devices in the at least one of the separate authorized user's possession, the confirmation being a second user authentication input; and
modify the value associated with the setting of the automation and security system component based at least in part on the first user authentication input and the second user authentication input.

13. The computer-program product of claim 12, wherein the first user authentication input is one of a password and a PIN code.

14. The computer-program product of claim 12, wherein the instructions are executable by the processor to:
receive confirmation that the user has authorized the at least one function using the electronic device.

15. The computer-program product of claim 12, wherein the first user authentication input includes confirmation of the user's presence at a property monitored by the automation and security system.

16. The computer-program product of claim 12, wherein the instructions are executable by the processor to:
send the authentication message to an electronic device associated with the user.

17. A computer-implemented method for authenticating a user of an automation and security system, comprising:
detecting a presence of the user within a predetermined distance of the automation and security system based at least in part on sensor data;
receiving, from an electronic device carried by the user, a request to perform at least one function of the automation and security system based at least in part on the detection, the at least one function including a rule of operation for an automation and security system component associated with the automation and security system;
determining a level of authentication associated with the request to perform the at least one function based at least in part on the detection;
receiving facial recognition information from the electronic device as a first level of authentication to authorize the received request;
confirming that the user is an authorized user based at least in part on the facial recognition information;
communicating, to one or more separate electronic devices associated with one or more separate authorized users of the automation and security system, an authentication message in response to confirming the user as the authorized user;
receiving confirmation that at least one of the separate authorized users has received the authentication message at the at least one separate electronic devices carried by the at least one of the separate authorized users, wherein the received confirmation comprises a second level of authentication to authorize the received request; and
modifying the rule of operation of the automation and security system component based at least in part on the first level of authentication and the second level of authentication.

18. The method of claim 17, wherein the request from the user is received as a voice command.

19. The method of claim 17, further comprising:
receiving confirmation that the user has authorized the at least one function using the electronic device.

20. The method of claim 17, further comprising:
receiving confirmation that the user has received the authentication message at the electronic device carried by the user, wherein the electronic device includes an application that displays the authentication message to the user.

21. The method of claim 17, further comprising:
receiving a registration of the electronic device as being associated with the user.

* * * * *